United States Patent [19]

Mahlein et al.

[11] Patent Number: 4,682,843

[45] Date of Patent: Jul. 28, 1987

[54] OPTICAL WAVEGUIDE JUNCTION AND METHOD OF MAKING SAID JUNCTION

[75] Inventors: Hans F. Mahlein, Unterhaching; Herbert Michel, Munich; Achim Reichelt, Unterhaching; Gerhard Winzer, Putzbrunn, all of Fed. Rep. of Germany

[73] Assignee: Siemens Aktiengesellschaft, Berlin and Munich, Fed. Rep. of Germany

[21] Appl. No.: 583,911

[22] Filed: Feb. 27, 1984

[30] Foreign Application Priority Data

Mar. 23, 1983 [DE] Fed. Rep. of Germany ....... 3310587

[51] Int. Cl.$^4$ ............................ G02B 6/26; G02B 6/42
[52] U.S. Cl. .................................... 350/96.15
[58] Field of Search ............................... 370/1, 2, 3, 4; 350/96.15, 96.18

[56] References Cited

U.S. PATENT DOCUMENTS

| | | | |
|---|---|---|---|
| 4,339,290 | 7/1982 | Winzer et al. | 156/159 |
| 4,440,470 | 4/1984 | Khoe | 350/96.18 |
| 4,456,329 | 6/1984 | Henderson et al. | 350/96.18 |

OTHER PUBLICATIONS

Winzer et al.; "Single-Mode & Multimode ... Couplers for WDM; *Applied Optics;* vol. 20, No. 18; 9/15/81; pp. 3128–3133.

*Primary Examiner*—Robert E. Wise
*Attorney, Agent, or Firm*—Jeffrey P. Morris

[57] ABSTRACT

An optical waveguide junction which can be used as a wavelength demultiplexer, having two aligned fibers separated from each other by a wavelength-selective filter and a fiber branching off laterally from these fibers at the level of the filter. At the same time, a greater degree of coupling efficiency, applicability in monomode fiber lines, and greater adjusting tolerances in production of the junction are achieved. It is recommended that each of the two aligned fibers have different core diameters, while the fiber feeding the filter has a smaller core diameter than the fiber continuing from the filter. In one embodiment of the invention the feed fiber includes a monomode fiber and the continuing fiber of a multimode. The junction can be used as a demultiplexer for optical-fiber transmission lines for unidirectional operation for demultiplexing.

5 Claims, 1 Drawing Figure

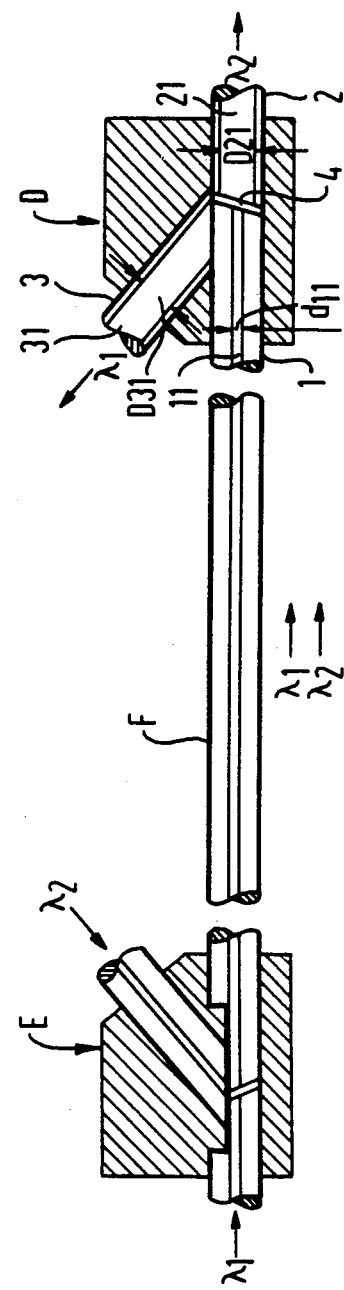

OPTICAL WAVEGUIDE JUNCTION AND METHOD OF MAKING SAID JUNCTION

BACKGROUND OF THE INVENTION

The present invention relates to an optical waveguide junction which can be used as a wavelength demultiplexer. It has a pair of aligned fibers, a partially previous layer arranged between the fibers and diagonally to their axis, and a fiber branching off laterally from the pair of aligned fibers at the level of the intermediate partially pervious layer.

A typical optical waveguide junction is disclosed in U.S. Pat. No. 4,339,290. Junctions of this type can be used as wavelength demultiplexers, if a wavelength-selective filter is used as a partially pervious layer. Demultiplexers of this type have already been proposed.

In the above-mentioned junction, all three fibers are identical, in that they all have the same core diameter and outer diameter. However, junctions and demultiplexers have already been proposed where the aligned fibers are monomode fibers and the branching fiber is a multimode fiber with a considerably larger core diameter than the monomode fibers. Furthermore, the branching fiber must not branch off at right angles to the aligned fibers, as in the case of the typical junction; particularly with regard to demultiplexers, it has proven desirable to arrange the wavelength-selective filter at an angle of inclination to the fiber axis exceeding 45°, which requires that the branching fiber runs diagonally to the aligned fiber. In the case of other junctions, particularly demultiplexers, the aligned fibers which are separated by the partially pervious layer always consist of identical fibers. One reason for this is in manufacturing junctions of this type, the aligned fibers are produced by a spacing step in which a carrier for fibers and the fibers attached to it are separated transversely to their axis. Also, the two separated parts, after a partially pervious layer has been supplied to the two polished interfaces thus formed, are reconnected with one another in such a manner that the separated fibers are axially realigned, and the carrier again takes on its original shape.

A separation of this type is possible, because among other reasons the process steps for aligning the axes of the optical waveguides to each other are self-adjusting. This results in a simplification of the production process, and at the same time it results in greater accuracy and reproducibility (see published German Patent Application DE-OS No. 29 20 957 at page 6). In particular, the high degree of accuracy that can be achieved permits a high degree of coupling efficiency between the identical aligned fibers of the junction, and even permits the production of junctions where the aligned fibers consist of monomode fibers, the coupling of which requires particularly high adjusting tolerances, and where the coupling efficiency has clearly defined limits.

SUMMARY OF THE INVENTION

The object of this invention is to produce a junction useable as a wavelength demultiplexer, which has an increased degree of coupling efficiency between the aligned fibers, which can be used with monomode fiber lines in particular, and which allows substantial adjusting tolerances during production.

In general, the invention features, in one aspect, an optical waveguide junction having a pair of aligned fibers, a partially pervious layer arranged between the fibers and diagonally to their axis, and the fiber branching off laterally from the pair of aligned fibers at the level of the intermediate partially pervious layer, in which the light-conducting cores of the pair of aligned fibers have different diameters, and the core diameter of the aligned fiber, which continues from the partially pervious layer, is larger than the core diameter of the aligned fiber feeding the partially pervious layer.

In preferred embodiments of the optical waveguide junction the branching fiber core diameter is larger than the core diameter of the fiber feeding the partially pervious layer; the fiber feeding the partially pervious layer is a monomode fiber, and the fiber which continues from the partially pervious layer and the branching fiber are multimode fibers; the aligned fibers have the same outer diameter; the junction is located at the output end of an optical-fiber transmission line for unidirectional transmission for signal distribution, with the fiber feeding the partially pervious layer of the device being identical with, or coupled to, a fiber of the transmission line which has a core diameter no larger than the core diameter of the fiber feeding the partially pervious layer; the junction is used as a wave-length demultiplexer which is located at the output end of the optical-fiber transmission line for unidirectional multi-channel transmission for demultiplexing operations, with the branching fiber of the demultiplexer, which is fed to the frequency-selective partially pervious layer, being identical to, or coupled with, a fiber of the transmission line which has a core diameter no larger than that of the branching fiber of the demultiplexer; and the junction is used as a wave-length demultiplexer which is located at the output end of an optical-fiber transmission line for unidirectional dual-channel transmission by means of a monomode fiber for demultiplexing operations, with the monomode fiber of the demultiplexer, which feeds the frequency-selective partially pervious layer being identical to a monomode fiber of the transmission line, or coupled with such a fiber.

This invention provides a new approach which is totally different from previous concepts. According to the previous concepts the aligned fibers must be identical. This previous approach is supported by both manufacturing and application considerations. These considerations include the fact that a junction or demultiplexer with identical aligned fibers can be used both for distributing and demultiplexing the feed signals, and for a coupling element by means of which signals can be coupled in the transmission channel. Consequently, only a single component is required for both the input and the output end of the transmission channel, or for an optical-fiber transmission line. This takes into account the widespread efforts to develop a system with as few different elements is possible.

In contrast to this, the possibility of using the junction or the demultiplexer simultaneously as a coupling element is purposely disregarded in this invention. Instead, a junction and a demultiplexer are intended, according to the invention, only for use at the output end of the optical-fiber transmission line, for unidirectional transmission to permit signal distribution, or for demultiplexing, respectively.

This offers the advantage, among others, that not only are greater adjusting tolerances in the transmission channel allowed, but also, particularly in connection with monomode fibers, a higher degree of coupling efficiency is achieved.

A further advantage is that a stack structure, such as disclosed in published German Patent Application DE-OS No. 29 20 957, can also be designed for a junction according to this invention. In this case, however, because the aligned fibers are now not identical, a modification is required.

In general, the invention features, in another aspect, a method for producing an optical wave guide junction having a pair of aligned fibers, a partially pervious layer arranged between the fibers and diagonally to their axis, and a fiber branching off laterally from the pair of aligned fibers at the level of the intermediate partially pervious layer, in which light-conducting cores of the pair of aligned fibers have different diameters, and the core diameter of the aligned fiber, which continues from the partially pervious layer, is larger than the core diameter of the aligned fiber feeding the partially pervious layer, and wherein the junction is assembled with three blocks of which the first only carries the feed fibers, the second only carries the continuing aligned fibers having a relatively thick core, and the third only carries the branching fibers.

This production method is possible, in particular because the cores of the aligned fibers, having different thicknesses, permit lateral displacements of the axis. In this respect, the coupling of a monomode fiber with a multimode fiber is not particularly critical.

Other features and advantages of the present invention will become apparent from the following detailed description, and from the claims.

For a full understanding of the present invention, reference should now be made to the following detailed description and to the accompanying drawing.

BRIEF DESCRIPTION OF THE DRAWING

The single FIGURE shows an optical-fiber transmission device for dual-channel transmission.

DETAILED DESCRIPTION

The device includes coupling element E, demultiplexer D according to the invention, and, as a transmission line, monomode fiber F connecting the coupling element with the demultiplexer. By means of coupling element E (not described in greater detail), two wavelengths $\lambda 1$ and $\lambda 2$ can be coupled in monomode fiber F independently of each other, and then transmitted to demultiplexer D.

Demultiplexer D includes two aligned fibers 1 and 2, branching fiber 3, and wavelength-selective layer 4, which is arranged between the two aligned fibers at an angle to their axis, which for example, can be a cut-on filter in the form of a dielectric multiple layer. The layer or cut-on filter 4 may be previous to wavelength $\lambda 2$, but not to wavelength $\lambda 1$.

Fiber 1 of the demultiplexer feeding wavelengths $\lambda 1$ and $\lambda 2$ to layer 4, includes a monomode fiber which is coupled with monomode fiber F of the line, or identical with it. Light-conducting core 11 of feed fiber 1 has a very small diameter $d_{11}$, which is typically not in excess of 10 microns.

Fiber 2 conducting wavelength $\lambda 2$ from layer 4, includes a multimode fiber having light-conducting core 21 with a diameter $D_{21}$ which is much larger than diameter $d_{11}$ of monomode fiber 1, which is typically 50 to 100 microns.

It is desirable for the two aligned fibers 1 and 2 to have the same outer diameter. This facilitates the adjustment of the aligned fibers.

Branching fiber 3, which conducts the wavelength $\lambda 1$ from layer 4, also includes a multimode fiber, and is in the present case, identical with fiber 2; typically diameter $D_{31}$ of core 31 is equal to diameter $D_{21}$. Furthermore, branching fiber 3 also has the same outer diameter as the two aligned fibers 1 and 2.

The adjustment of fibers 1 and 2 to one another is not critical due to the great difference between the diameter $D_{21}$ and the diameter $d_{11}$. Therefore, even if adjusted fibers 1 and 2 are not exactly aligned, it nevertheless ensures a high degree of coupling efficiency for the transmission from fiber 1 to fiber 2.

Three blocks form the basis for the manufacture of demultiplexer D: the first carries parallel monomode fibers 1, the second parallel multimode fibers 2, and the third parallel multimode fibers 3. All the fibers are arranged at an equal distance from one another, and the blocks are assembled by a process similar to that described in published German Patent Application DE-OS No. 29 20 957, so that several fibers junctions, of the type shown in demultiplexer D, are arranged in planes running parallel to the plane of the drawing.

For example, after filter 4 has been vapor-deposited on the block carrying fibers 1 or fibers 2, these two blocks are first cemented with one another; then the block carrying fibers 3 is cemented on.

By cutting the resulting block between the fibers parallel to the plane of the drawing, several identical demultiplexers D can be obtained.

There has thus been shown and described an optical waveguide junction and method of making said junction, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a optical waveguide junction for an optical transmission line having a lead-in and a lead-out aligned fiber pair with a partially pervious layer arranged between the lead-in and lead-out aligned fibers and diagonally to their axis and a fiber branching off laterally from the lead-in and lead-out aligned fibers at the level of the partially pervious layer, wherein the lead-in and an optical transmission line fiber are monomode fibers, the core diameter of the transmission line fiber being no larger than the core diameter of the lead-in fiber, while the lead-out fiber, which continues from the partially pervious layer and also the branching fiber are multimode fibers and, further, the core diameter o f the lead-out aligned fiber, which continues from the partially pervious layer, is larger than the core diameter of the lead-in aligned fiber feeding the partially pervious layer, and wherein the junction operates as a wave-length demultiplexer which is located at the output end of the optical-fiber transmission line for unidirectional multichannel transmission for demultiplexing operations, with the branching fiber of the demultiplexer being fed from the frequency-selective partially pervious layer, the lead-in aligned fiber being integral with or coupled to a fiber of the transmission line, which transmission line fiber has a core diameter no larger than that of the branching fiber of the demultiplexer.

2. The optical waveguide junction according to claim 1, wherein the branching fiber core diameter is larger than the core diameter of the lead-in fiber feeding the partially pervious layer.

3. The optical waveguid junction according to claim 1, wherein the aligned lead-in and lead-out fibers have the same outer diameter.

4. The optical waveguide junction according to claim 1, wherein the junction is used as a wave-length demultiplexer which is located at the output end of an optical-fiber transmission line for unidirectional dual-channel transmission by means of a monomode lead-in fiber for demultiplexing operations, and the monomode lead-in fiber of the demultiplexer, which feeds the frequencyselective partially pervious layer, is integral with a monomode fiber of the transmission line, or coupled to such a fiber.

5. In a method for producing an optical wave guide junction having a pair of aligned fibers, a partially pervious layer arranged between the fibers and diagnoally to their axis, and a fiber branching off laterally from the pair of aligned fibers at the level of the intermediate partially pervious layer, wherein light-conducting cores of the pair of aligned fibers have different diameters, and the core diameter of the aligned fiber, which continues from the partially pervious layer, is larger than the core diameter of the aligned fiber feeding the partially pervious layer, by assembling blocks, each of which carries one or more parallel fibers, the improvement comprising the step of assembling the junction from three blocks of which the first block only carries the lead-in or feed fibers which are monomode fibers, the second block only carries the continuing or lead-out aligned fibers having the same outer diameter as the lead-in fibers but being multimode and having a relatively thick core, and the third block only carries the branching fibers which also are multimode and have a relatively thick core.

* * * * *